United States Patent
Waters

(10) Patent No.: US 9,690,955 B2
(45) Date of Patent: Jun. 27, 2017

(54) TUNNELING MESSAGES OVER AN USB TO CONTROL POWER DELIVERY

(71) Applicant: TEXAS INSTRUMENTS INCORPORATED, Dallas, TX (US)

(72) Inventor: Deric Wayne Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 75 days.

(21) Appl. No.: 14/730,733

(22) Filed: Jun. 4, 2015

(65) Prior Publication Data

US 2015/0370299 A1  Dec. 24, 2015

Related U.S. Application Data

(60) Provisional application No. 62/013,824, filed on Jun. 18, 2014.

(51) Int. Cl.
*G06F 1/26* (2006.01)
*G06F 21/85* (2013.01)
(Continued)

(52) U.S. Cl.
CPC ............. *G06F 21/85* (2013.01); *G06F 1/26* (2013.01); *G06F 13/122* (2013.01); *G06F 13/364* (2013.01); *G06F 21/81* (2013.01)

(58) Field of Classification Search
CPC ................................. G06F 1/26; G06F 1/266
(Continued)

(56) References Cited

U.S. PATENT DOCUMENTS 6,448,672 B1    9/2002  Voegeli et al.
7,646,107 B2 *  1/2010  Smith ................... H02J 7/0055
                                                    307/11
(Continued)

FOREIGN PATENT DOCUMENTS

WO    WO2014004021 A2    1/2014

OTHER PUBLICATIONS

Search Report for PCT Application No. PCT/US15/36511, dated Oct. 29, 2015 (1 page).
(Continued)

*Primary Examiner* — Chun Cao
(74) *Attorney, Agent, or Firm* — William B. Kempler; Charles A. Brill; Frank D. Cimino

(57) ABSTRACT

An electronic system includes a computer and a power adapter. The computer includes an embedded controller (EC) coupled to a computer power delivery (PD) controller. The power adapter includes a power adapter PD controller connected to a slave device and is configured to communicate with the computer over a communication link. The computer PD controller is configured to receive a command from the EC and, to transmit a universal serial bus (USB) vendor defined message (VDM) header and one or more vendor defined objects (VDOs) including the information of the payload of the transmit command. The power adapter PD controller responds to the one or more VDOs either by changing an output signal to the slave device connected to the power adapter PD controller, reports a state of a general purpose input/output (GPIO) pin of the power adapter PD controller, or changes the state of the GPIO pin.

20 Claims, 4 Drawing Sheets

(51) Int. Cl.
*G06F 13/364* (2006.01)
*G06F 13/12* (2006.01)
*G06F 21/81* (2013.01)

(58) Field of Classification Search
USPC .................................................. 713/300
See application file for complete search history.

(56) References Cited

U.S. PATENT DOCUMENTS

| | | | | | |
|---|---|---|---|---|---|
| 8,266,348 | B2* | 9/2012 | Trivedi | ............... | G06F 1/26 307/151 |
| 8,909,955 | B2* | 12/2014 | Abdelsamie | ........... | G06F 1/26 713/310 |
| 2010/0295384 | A1* | 11/2010 | Kobayashi | .......... | G06F 13/385 307/154 |
| 2012/0137038 | A1* | 5/2012 | Huang | ............... | G06F 1/1632 710/303 |
| 2013/0219489 | A1* | 8/2013 | Tribble | ................ | G06F 21/34 726/18 |
| 2013/0346666 | A1* | 12/2013 | Chang | ................ | G06F 13/20 710/313 |
| 2014/0143574 | A1* | 5/2014 | Ma | .................... | G06F 1/3234 713/323 |
| 2014/0359318 | A1* | 12/2014 | Liu | ..................... | G06F 1/26 713/300 |
| 2015/0346792 | A1* | 12/2015 | Rathi | ................. | G06F 1/266 713/310 |

OTHER PUBLICATIONS

Michael Vega, "How to Implement SHA-1/HMAC Authentication for bq26100," Texas Instruments, Application Report, SLUA389A—Jul. 2006—Revised Oct. 2006 (6 pages).

* cited by examiner

TUNNELING MESSAGES OVER AN USB TO CONTROL POWER DELIVERY

CROSS-REFERENCE TO RELATED APPLICATIONS

The present application claims priority to U.S. Provisional Patent Application No. 62/013,824, filed Jun. 18, 2014, titled "Tunneling in USB Power Delivery," which is hereby incorporated herein by reference in its entirety.

BACKGROUND

Electronic systems such as computers often include peripheral devices and computer-related equipment connected to a computer for a variety of reasons. For example, a power adapter may be coupled to the computer to provide operating power to the computer. It is possible, however, that a power adapter that was not made by the manufacturer of the computer is used to connect to the computer. An untrustworthy power adapter may not provide charging power safely to the computer.

SUMMARY

In one embodiment, an electronic system includes a computer and a power adapter. The computer includes an embedded controller (EC) coupled to a computer power delivery (PD) controller. The power adapter includes a power adapter PD controller connected to a slave device and is configured to communicate with the computer over a communication link. The communication link including signals over which a power negotiation is made between the computer PD controller and the power adapter PD controller. The computer PD controller is configured to receive a command from the EC and, in response to the received command, to generate and transmit across the communication link a universal serial bus (USB) vendor defined message (VDM) header and one or more vendor defined objects (VDOs) including the information of the payload of the transmit command. The power adapter PD controller is configured to respond to the one or more VDOs either by changing an output signal to the slave device connected to the power adapter PD controller, to report back to the computer PD controller a state of a general purpose input/output (GPIO) pin of the power adapter PD controller, or to change the state of the GPIO pin.

In another embodiment, a computing device includes an EC and a computer PD controller coupled to the EC and configured to communicate with a PD controller in an adapter over a communication link to thereby negotiate a power allocation between the PD controllers. The computer PD controller is configured to receive a command from the EC and, in response to the received command, to generate and tunnel across the communication link a universal serial bus (USB) vendor defined message (VDM) header and one or more vendor defined objects (VDOs) including the information from the received command to thereby communicate with a slave device coupled to the adapter PD controller. The computer PD controller also is configured to receive a status message from the adapter PD controller across the communication link indicative of a logic state of a general purpose input/output (GPIO) pin of the power adapter PD controller.

In yet another embodiment, a method includes sending a wake command from an embedded controller in a computer to a PD controller in the computer to wake up a slave device in an adapter. The method further includes tunneling a command by the computer PD controller to a PD controller in the adapter to cause the slave device to wake up, relaying the tunneled command by the power adapter PD controller to the slave device, and waking up the slave device.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Embodiments are described below that permit an embedded controller in a computer to cause commands to be tunneled through a USB Power Delivery interface to an adapter (e.g., a power adapter). The tunneled commands may perform any of a variety of functions such as waking up a slave device in the power adapter, authenticating the slave device (and thus adapter), etc.

Figure 1:
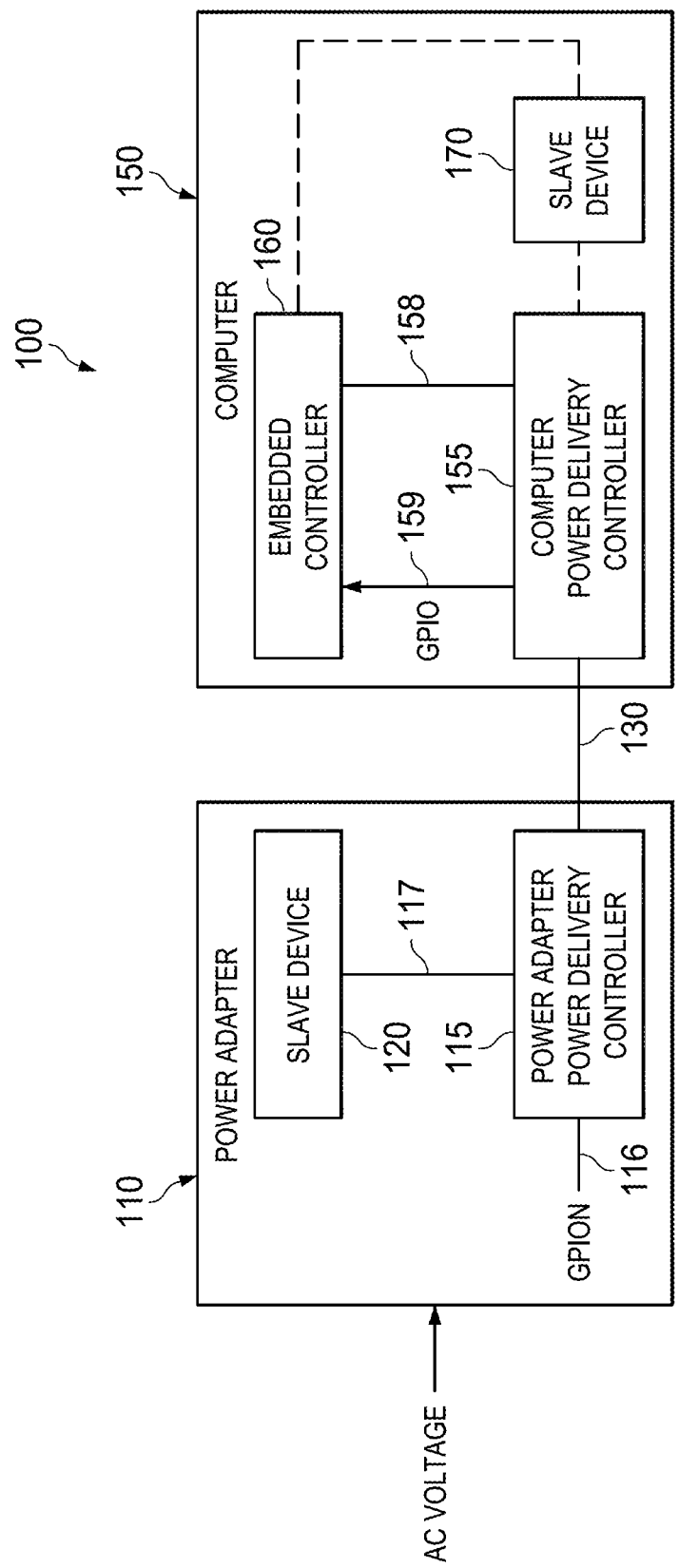
FIG. 1 shows a system in accordance with various examples.

FIG. 1 shows an example of an electronic system 100 comprising a power adapter 110 coupled to a computing device such as a computer 150. In this example, the computer 150 is a portable computing device such as a notebook computer, a tablet computer, a smart phone, a personal digital assistant (PDA), or any other type of portable computing device. In other examples, the computer 150 may be a desktop computer. The power adapter 110 receives an alternating current (AC) voltage and provides one or more direct current (DC) voltages to the computer 150 to provide the operating power to the computer. The operating power is provided from the power adapter 110 to the computer 150 over a communication link 130. In this example, the computer 150 includes an embedded controller (EC) 160 coupled to a computer power delivery (PD) controller 155 over a bus 158. A slave device 170 may also be included in the computer and coupled either to the computer PD controller 155 or to the EC 160 as indicated by the dashed lines. The power adapter 110 also includes a power adapter PD controller 115. The power adapter PD controller 115 couples to a slave device 120 over a bus 117 and may also provide one or more general purpose input/output (GPIO) pins 116.

In one example, the power adapter 110 may be part of a docking station for the computer 150, and the GPIO pin may be used to indicate when the user wants to undock the computer. In that situation, the user may press a button which changes the logic state of the GPIO pin 116. By tunneling commands between the PD controllers 115 and 155, the EC 160 in the computer 150 can read the status of the GPIO pin and thus know when the user desires to undock the computer. In one example, the power adapter PD controller may tunnel a message over the communication link to the computer PD controller indicating the GPIO pin 116 of the power adapter PD controller has changed state. The computer PD controller may respond by asserting a GPIO pin 159 of the computer PD controller to signal to the EC 160 that an event has occurred (the event being the state change of the GPIO pin 116 of the power adapter's PD controller 115).

The buses 117 and 158 coupling the power adapter PD controller 115 and slave device 120 as well as EC 160 to the computer PD controller 155, respectively, may be any suitable type of bus. In one example, such buses may be implemented as the System Management Bus (SMBus), the Inter-Integrated Circuit (I2C), Slave Data Queue (SDQ) bus, High Speed Data Queue (HDQ), Universal Asynchronous Receiver/Transmitter (UART), Serial Peripheral Interface (SPI), etc. The buses 117 and 158 may implement the same bus protocol or different protocols.

The communication link 130 between power adapter 110 and computer 150 includes a plurality of electrical lines, some of which may carry data and others of which carry power. In one example, the communication link complies with the USB Type-C Specification (e.g., USB Type-C Specification 1.0). Table I below provides a description of the various pins of a USB Type-C communication link. The USB Type-C communication pinout is such that the connectors on either end of the cable are reversible, unlike previous versions of USB standards.

exchanged between PD controllers 115, 155 using the CC signal line so that the computer 150 and power adapter 115 can agree on how much power the power adapter 110 is to supply to the computer 150. Some power adapters 115 may be configurable to provide any of multiple power allocations within a range of power allocations (e.g., 45 watts, 60 watts, 100 watts, etc.) depending on the needs of the computer.

The slave devices 120, 170 can be any suitable type of device desired for any desired application. In one implementation, each slave device 120, 170 is an authentication device such as the BQ26100 SHA-1/HMAC Based Security and Authentication Integrated Circuit With SDQ Interface by Texas Instruments Inc. This device provides an authentication method. When used in the power adapter 110, the BQ26100 can be used by the EC 160 to authenticate the power adapter 110 thereby ensuring that only authenticated power adapters are enabled to provide to the computer 150, or that power adapters that are not authenticated are limited by the computer 150 in terms of how much power they can provide to the computer. The BQ26100 communicates with the PD controller 115 over a one-wire bi-directional serial interface (SDQ) bus 117. The computer 150 also may include a BQ26100 which can be used to calculate correct response to an authentication challenge string. The calculation can be very involved so in some cases it may be beneficial to off-load the calculation to an external component such as the BQ26100.

In accordance with the disclosed embodiments, the PD controllers 115, 155 can be used to "tunnel" commands and data between the EC 160 and the slave device 120 connected to the power adapter PD controller 115 (i.e., the slave device in the power adapter). Tunneling such information refers to the use of one protocol or interface to send information, which will be provided downstream over a different protocol or interface. As described below, commands are defined that provide a way to send information along with descriptors in vendor defined message (VDM) packets using USB Power Delivery communications. The descriptors enable the receiver of such packets to relay the information using a

TABLE 1

USB Type-C Connector Pinouts.

| Pin | Name | Description | Pin | Name | Description |
|---|---|---|---|---|---|
| A1 | GND | Ground return | B12 | GND | Ground return |
| A2 | SSTXp1 | SuperSpeed differential pair #1, TX, positive | B11 | SSRXp1 | SuperSpeed differential pair #1, RX, positive |
| A3 | SSTXn1 | SuperSpeed differential pair #1, TX, negative | B10 | SSRXn1 | SuperSpeed differential pair #1, RX, negative |
| A4 | $V_{BUS}$ | Bus power | B9 | $V_{BUS}$ | Bus power |
| A5 | CC1 | Configuration channel | B8 | SBU2 | Sideband use (SBU) |
| A6 | Dp1 | USB 2.0 differential pair, position 1, positive | B7 | Dn2 | USB 2.0 differential pair, position 2, negative |
| A7 | Dn1 | USB 2.0 differential pair, position 1, negative | B6 | Dp2 | USB 2.0 differential pair, position 2, positive |
| A8 | SBU1 | Sideband use (SBU) | B5 | CC2 | Configuration channel |
| A9 | $V_{BUS}$ | Bus power | B4 | $V_{BUS}$ | Bus power |
| A10 | SSRXn2 | SuperSpeed differential pair #2, RX, negative | B3 | SSTXn2 | SuperSpeed differential pair #2, TX, negative |
| A11 | SSRXp2 | SuperSpeed differential pair #2, RX, positive | B2 | SSTXp2 | SuperSpeed differential pair #2, TX, positive |
| A12 | GND | Ground return | B1 | GND | Ground return |

One of the signal lines in communication link 130 is the communication channel (CC) signal line. The CC signal line can be used by the PD controllers 115 and 155 of the power adapter 110 and computer 150, respectively, to negotiate a power allocation. In one example, power information is different protocol. For example, the bytes from a VDM packet may be extracted and transmitted using the I2C or SMBus protocol to another device such as slave devices 120, 170. Other protocols such as SDQ, HDQ, UART, or SPI could also be supported with the appropriate descriptors.

The interface described herein decouples the USB PD controllers from the details of the information transaction to some extent to provide necessary flexibility to users without requiring (potentially costly) customizations to the USB PD controller itself. As a result, the EC is effectively able to communicate with the slave device 120 that is in the power adapter 110. A suitable set of SMBus commands (for the example in which bus 158 is an SMBus interface) and Vendor Defined Message (VDM) commands are provided below to implement this system.

The following description describes the messaging between PD controllers 115 and 155 using VDMs. The VDM packet structure includes a preamble followed by a start-of-packet sequence, followed by a Message Header (which contains the length of the packet), followed by the VDM Header, followed by one or more vendor defined objects (VDOs). When transmitted across the channel, a 32-bit Cyclic Redundancy Check (CRC) may be appended and the bits (starting with the Message Header) may be encoded using a 4b5b encoding and finally a 5-bit end-of-packet sequence may be appended. Table 2 below shows an example of the VDM Header.

TABLE 2

VDM Header for Authentication.

| Bits | Description | |
| --- | --- | --- |
| B31 . . . 16 | Vendor ID (VID) | Unique 16-bit ID assigned by USB I/F to the vendor. |
| B15 . . . 0 | VDM Type (bit 15 is zero; these are all unstructured VDMs) | 00h: Authenticate Start/Stop<br>01h: Authenticate Challenge<br>02h: Authenticate Challenge Part2<br>03h: Authenticate Response (may be protocol error too)<br>04h: Enter Increased Power Mode (No VDO)<br>05h: Exit Increased Power Mode (No VDO)<br>06h: GPIO_Status<br>07h: GPIO_Write |

The Vendor Identifier (VID) is an identifier assigned to the vendor of the PD controller issuing the packet. The example above defines eight types of packet requests. The authenticate start/stop (VDM Type 00h) initiates an authentication process by the EC 160 which is intended for the slave device 120. That is, the EC 160 in the computer 150 starts a method by which the slave device 120 in the power adapter 110 is to be authenticated to the computer. The authenticate challenge (VDM Type 01h) conveys part of the authentication challenge value and the authenticate challenge part 2 (VDM Type 02h) conveys the rest of the authentication challenge value. VDM Type 03h is for an authenticate response. The authenticate response VDM returns a response to an authentication challenge initiated by the authenticate challenge VDMs. VDM Type 04h is a request by the computer PD controller 155 for the power adapter 110 to increase its power allocation to the computer, and VDM Type 05h is a message by which the computer PD controller 155 requests the power adapter PD controller 115 to exit the increase power mode. VDM Types 06h and 07h relate to the GPIO pin 116 on the power adapter PD controller 115. The GPIO_Status VDM type (06h) is made by the computer PD controller 155 to read the status of the power adapter PD controller's GPIO pin 116, and GPIO_Write (VDM Type 07h) permits the computer PD controller 155 to change the logic state of the GPIO pin 116.

Some of the above-identified VDM types also include one or more VDOs, examples of which are described below and defined in Tables 3-13. Table 3, for example, defines the bits in a VDO which is provided by the power adapter PD controller 115 in response to a GPIO_Status VDM from the computer PD controller 155. In this example, two GPIO pins 116 are provided on the power adapter PD controller 115 (GPIO) and GPIO1) and the status of each GPIO pin is provided in the VDO. Bits 30 and 31 encode the state of GPIO0 and bits 30 and 31 encode the state of GPIO1.

TABLE 3

VDO for GPIO_Status Unstructured VDM.

| Bits | Description | |
| --- | --- | --- |
| B31, 30 | GPIO0 | 00b: GPIO0 is being pulled low.<br>01b: GPIO0 is not being pulled low.<br>10b: reserved<br>11b: reserved |
| B29, 28 | GPIO1 | 00b: GPIO1 is being pulled low.<br>01b: GPIO1 is not being pulled low.<br>10b: reserved<br>11b: reserved |
| B27 . . . 0 | Reserved | More GPIO's may be supported in like manner. |

Table 4 defines the bits in a VDO pertaining to changing the status of the GPIO pins using the GPIO_Write VDM Type. Each GPIO pin can be separately written to be a logic high, a logic low, or placed into a high impedance (high-z) state. Bits 30 and 31 are used to set the state for GPIO0 and bits 28 and 29 are used to set the state for GPIO1.

TABLE 4

VDO for GPIO_Write Unstructured VDM, there is only 1 VDO in this case.

| Bits | Description | |
| --- | --- | --- |
| B31, 30 | GPIO0 | 00b: pull GPIO0 low.<br>01b: drive GPIO0 high.<br>10b: release GPIO0 to be high-z<br>11b: reserved |
| B29, 28 | GPIO1 | 00b: pull GPIO1 low.<br>01b: drive GPIO1 high.<br>10b: release GPIO1 to be high-z<br>11b: reserved |
| B27 . . . 0 | Reserved | More GPIO's may be supported in like manner. |

Table 5 below provides definitions for the bits of the VDO for the authenticate start/stop VDM. This VDO includes various fields. An interface to external chip field (bits 29-31) can be used to specify the type of electrical interface to be used over which to perform the authentication method to a slave device that is local to the PD controller (e.g., slave device 170 connected to computer PD controller 155). Whether that interface is used to relay the information contained in the VDM or whether the USB power delivery communication is to be used to replay the VDM over communication link 130 is specified by bit 16. The address of the slave device can be specified in bits 0-15 and bit 28 specifies whether there is a slave address or whether the slave address is specified in bits 0-15. The special signal polarity bit (bit 27) can be used to put the slave device 120 into a sleep mode or to wake up the device from a sleep mode, and is used when the VDM type is 00h. The hold is applied to an SDA for either the I2C or SMBus or a one-wire bus (e.g., SDQ). Bits 24-26 are usable to specify a hold time for the signal line specified by bits 22-23.

TABLE 2

VDO for Authenticate Start/Stop Unstructured VDM.

| Bits | Description | |
|---|---|---|
| B31 . . . 29 | Interface to external chip | 000b: no external chip<br>001b: I2C<br>010b: SDQ<br>011b: SMBus<br>Other: reserved |
| B28 | Slave Address Included | 0b: no slave address provided.<br>1b: lower two bytes (B15 . . . B0) contain the slave address. |
| B27 | Special Signal Polarity | 0b: hold line low for HOLD<br>1b: hold line high for HOLD<br>other: reserved |
| B26 . . . 24 | Special signal hold time, time to hold the line low or high (HOLD). | 000b: 80 μs<br>001b: 160 μs<br>010b: 240 μs<br>011b: 320 μs<br>100b: 400 μs<br>101b: 480 μs<br>110b: 560 μs<br>111b: 620 μs |
| B23 . . . 22 | Special Signal Line Select | 00b: SDA line (the data wire in a one-wire protocol)<br>01b: SCL line<br>10b: $3^{rd}$ wire, such as ALRT signal in SMBus<br>11b: reserved |
| B21 . . . 17 | Reserved | |
| B16 | Send to local slave device | 0b: use interface (B31 . . . 29) to relay the information contained in this VDM.<br>1b: use USB PD communication to relay the VDM. |
| B15 . . . 0 | Slave address | This is only applicable if B28 = 1b |

A multi-byte challenge nonce can be provided from the EC 160 to the device to be authenticated such as the slave device 120 in the power adapter 110. The multi-byte challenge nonce (which may be, for example, a random number) can be provided between PD controllers by way of the VDOs illustrated in Tables 6-11. Multiple VDOs may be needed and six VDOs (VDO #1 through VDO #6) are shown in the example below. A 22 byte challenge nonce can be provided in these six VDOs, but even longer challenge nonces are possible as explained below. The VDO shown in Table 6 (VDO#1) includes some of the same fields explained above such as bits 29-31 (interface to external chip field), bit 28 (whether a slave address is included), and bits 0-15 to include the slave address if one is provided. If no slave address is provided, bits 0-15 are used to supply the first two bytes of the challenge nonce. Bits 23-27 are a 5-bit value that specifies the number of bytes to extract for the challenge nonce in the following VDOs. The order of the bytes may be lowest significant bytes first. Bit 20 can be used to specify that bits 8-15 contain the nth byte in the challenge nonce and is used in cases whether the length of the challenge nonce is greater than a predefined limit (e.g., 22).

TABLE 3

VDO #1 for Authenticate Challenge and Authenticate Challenge Part2.

| Bits | Description | |
|---|---|---|
| B31 . . . 29 | Interface to external chip | 000b: no external chip<br>001b: I2C<br>010b: SDQ<br>011b: SMBus<br>Other: reserved |
| B28 | Slave Address Included | 0b: no slave address provided<br>1b: lower two bytes (B15 . . . B0) contain the slave address (Byte 1 and Byte 2). |
| B27 . . . 23 | Number of bytes to extract contained in the following VDOs (LSBs first) | 5-bit value |
| B22 . . . 21 | Command code included | 00b: no command code in the VDO<br>01b: lower two bytes (B15 . . . B0) contain the command code (Byte 1 and Byte 2).<br>10b: upper two bytes of next VDO (B31 . . . 16) contain the command code (Byte 3 and Byte 4).<br>11b: reserved |

TABLE 3-continued

VDO #1 for Authenticate Challenge and Authenticate Challenge Part2.

| Bits | Description | |
|---|---|---|
| B20 | Byte 1 in this VDM is the N-th byte in the sequence. This allows for cases when more than 22 bytes are needed. | 0b: N = 0 (Authenticate Challenge) 1b: N = 23, a previous VDM contained Bytes 1 to 22 (Authenticate Challenge Part2). |
| B19 | Last VDM in the sequence | 0b: no, another VDM is coming. 1b: yes, this is the last VDM in the sequence |
| B18 . . . 17 | reserved | |
| B16 | Send to local slave device | 0b: use interface (B31 . . . 29) to relay the information contained in this VDM. 1b: use USB PD communication to relay the VDM. |
| B15 . . . 8 | Byte 1 | |
| B7 . . . 0 | Byte 2 | |

Tables 7, 8, 9, and 10 define the bits for the VDOs following the VDO of Table 6 and include the bytes of the challenge nonce. In this example, bytes 3-6 of the challenge nonce are in VDO #2. Bytes 7-10 of the challenge nonce are in VDO #3. Bytes 11-14 of the challenge nonce are in VDO #4. Bytes 15-18 of the challenge nonce are in VDO #5. Bytes 19-22 of the challenge nonce are in VDO #6.

TABLE 4

VDO #2 for Authenticate Challenge Unstructured VDM.

| Bits | Description |
|---|---|
| B31 . . . 24 | Byte 3 |
| B23 . . . 16 | Byte 4 |
| B15 . . . 8 | Byte 5 |
| B7 . . . 0 | Byte 6 |

TABLE 5

VDO #3 for Authenticate Challenge Unstructured VDM.

| Bits | Description |
|---|---|
| B31 . . . 24 | Byte 7 |
| B23 . . . 16 | Byte 8 |
| B15 . . . 8 | Byte 9 |
| B7 . . . 0 | Byte 10 |

TABLE 6

VDO #4 for Authenticate Challenge Unstructured VDM.

| Bits | Description |
|---|---|
| B31 . . . 24 | Byte 11 |
| B23 . . . 16 | Byte 12 |
| B15 . . . 8 | Byte 13 |
| B7 . . . 0 | Byte 14 |

TABLE 7

VDO #5 for Authenticate Challenge Unstructured VDM.

| Bits | Description |
|---|---|
| B31 . . . 24 | Byte 15 |
| B23 . . . 16 | Byte 16 |
| B15 . . . 8 | Byte 17 |
| B7 . . . 0 | Byte 18 |

TABLE 8

VDO #6 for Authenticate Challenge Unstructured VDM.

| Bits | Description |
|---|---|
| B31 . . . 24 | Byte 19 |
| B23 . . . 16 | Byte 20 |
| B15 . . . 8 | Byte 21 |
| B7 . . . 0 | Byte 22 |

Table 12 provides an example of a VDO which provides an authentication response. Bits 29-31 provided the response type. A value of 000b indicates the slave device did not provide a valid response. A value of 001b indicates that an acknowledgement was completed by the slave device. A value of 010b indicates that a negative acknowledgment was received and a value of 011 b indicates an error code of some sort was received. Bit 28 indicates whether bits 0-15 include a slave address or the first two bytes of the challenge response. Bits 23-27 provide a 5-bit value that specifies the number of bytes to extract for any data received from the slave device for the error code. The order of the bytes may be lowest significant bytes first. Bit 20 can be used to specify that bits 8-15 contain the nth byte in the error code value and is used in cases whether the length of the error code is greater than a predefined limit (e.g., 22).

TABLE 9

VDO #1 for Authenticate Response Unstructured VDM.

| Bits | Description | |
|---|---|---|
| B31 ... 29 | Response Type | 000b: No valid response from the slave device. |
| | | 001b: message ACK was complete |
| | | 010b: NACK received |
| | | 011b: Error code received |
| | | Else: reserved |
| B28 | Slave Address Included | 0b: no slave address provided |
| | | 1b: lower two bytes (B15 ... B0) contain the slave address. |
| B27 ... 23 | Number of bytes to extract contained in the following VDOs (LSBs first) that contain any data received from the slave device for the error code. | 5-bit value |
| B22 ... 21 | Reserved | |
| B20 | Byte 1 in this VDM is the N-th byte in the sequence. This allows for cases when more than 22 bytes are needed. | 0b: N = 0 |
| | | 1b: N = 23, a previous VDM contained Bytes 1 to 22. |
| B19 | Last VDM in the sequence | 0b: no, another VDM is coming. |
| | | 1b: yes, this is the last VDM in the sequence |
| B18 ... 16 | Reserved | |
| B15 ... 8 | Byte 1 | |
| B7 ... 0 | Byte 2 | |

Additional VDOs are included depending on the number of length of the error code. Table 13 shows the next VDO (VDO #2) which includes bytes 3-6 of the error code. Additional VDOs may be included as well as needed and generally follow the same format as for Tables 8-11.

TABLE 10

VDO #2 for Authenticate Response Unstructured VDM.

| Bits | Description |
|---|---|
| B31 ... 24 | Byte 3 |
| B23 ... 16 | Byte 4 |
| B15 ... 8 | Byte 5 |
| B7 ... 0 | Byte 6 |

The following discussion provides an example of the commands from the EC 160 to the computer PD controller 155. In one example, the EC 160 communicates with the computer PD controller 155 over a bus 158 that is an SMBus (or 120) interface. The bit fields for the SMBus commands from the EC 160 to the USB PD controller 155 may have the same definition as the bit fields for the VDM packets described above, so they are not repeated here. There are multiple commands useful to enable tunneling across communication link 130. The Authenticate Start/Stop can be used to wake up a slave device. The EC 160 can then populate VDM_PAYLOAD_TX according to the format described above to have a signal sent by either PD controller 115, 155 using the external interface specified.

Various commands can be issued by the EC 160 to PD controller 155. An example of such commands include STATUS_ALERT, STATUS_OTHER, STATUS_OTHER_MASK, STATUS_ALERT_MASK, GPIO_STATUS, GPIO_WRITE, AUTHENTICATE START/STOP, VDM_PAYLOAD_RX, VDM_PAYLOAD_TX, GENERIC WRITE, and GENERIC READ. The descriptions below of these commands and the references to specific bits are illustrative only—the specific bits can be other than those stated below.

The STATUS_ALERT command (command code 02h) is a read/write command and may have a command code of 02h. Bit 11 of this command may be asserted when a VDM_PAYLOAD_RX command occurs (see below) and contains new data. Bit 15 may be the StatusOther bit that is asserted when an unmasked bit in the STATUS_OTHER command has been asserted. The bits are cleared by writing a 1.

The STATUS_OTHER command (command code 0Eh) is a read/writecommand. Bit 0 is the CommandSendComplete bit that is asserted when the data in VDM_PAYLOAD_TX, GENERIC WRITE, or AUTHENTICATE START/STOP has been successfully transmitted. Bit 1 is the CommandSendFailed bit that is asserted if the computer PD controller 155 is unable to successfully transmit the data in the VDM_PAYLOAD_TX, GENERIC WRITE, or AUTHENTICATE START/STOP commands. Bit 31 is the GenericReadAvailable bit that is asserted when new data is available by way of the GENERIC READ command. The bits are written as 1 to clear them.

The STATUS_OTHER_MASK command (command code 0Fh) allows bits in the STATUS_OTHER command to be masked so that they do not affect the StatusOther bit (bit 15) of the STATUS_ALERT command.

The STATUS_ALERT_MASK command (command code 2Eh) allows bits in the STATUS_ALERT command to be masked so that they do not affect the ALRT pin.

The GPIO_STATUS command (command code 41h) allows the EC 160 to read the status of GPIO pins 116 of the power adapter PD controller 115 in the power adapter 110.

The GPIO_WRITE command (command code 42h) allows the EC 160 to change the state of GPIO pins 116 of the power adapter PD controller 115 in the power adapter 110.

The AUTHENTICATE START/STOP command (command code 46h) permits the EC 160 to initiate an authentication process to a slave in the power adapter 110. Bits 31:29 may be used to specify the interface to be used on the power adapter PD controller 115 to perform the authentication. Bit 28 may be used to indicate whether a slave address is included and bits 15:0 may specify the slave address if included. Bit 27, bits 26:24, bits 23:22, and bit 16 may indicate the signal polarity, hold timing, special signal line select information, and local slave communication information, respectively, as explained previously with regard to the Authenticate Start/Stop VDM of Table 5. By defining the bit fields the same or similarly in the AUTHENTICATE START/STOP command from the EC as to the VDM communicated by the PD controllers 155, 115 across the communication link 130, the tunneling of the command is made relatively straightforward.

The VDM_PAYLOAD_RX command (command code 49h) is a read only command that contains the data in the last VDM packet that was received. The VDM_PAYLOAD_TX command (command code 4Ah) is a read/write block command that can be filled with any data desired by the EC 160. For example, the data placed into this command can be formatted the same as the tunneling command described for VDM packets.

The GENERIC WRITE command (command code 4Bh) is a read/write block command that may include up to, for example, 24 bytes. Table 14 below provides an example of the bit definitions of this command.

TABLE 14

GENERIC WRITE COMMAND.

Blk0: B31 . . . 29: Interface to external chip
Blk0: B28: Slave address included
Blk0: B27 . . . 23: Number of bytes in VDM
Blk0: B22 . . . 21: Command code included.
Blk0: B20: Byte 1 definition
Blk0: B19: Last VDM in the sequence.
Blk0: B18 . . . 17: reserved
Blk0: B16: Send to local slave device
Blk0: B15 . . . 8: Byte1 (Byte23 if Last VDM = 1b)
Blk0: B7 . . . 0: Byte2 (or Byte24)
Blk1: B31 . . . 24: Byte3 (or Byte25)
Blk1: B23 . . . 16: Byte4 (or Byte26)
Blk1: B15 . . . 8: Byte5 (or Byte27)
Blk1: B7 . . . 0: Byte6 (or Byte28)
Blk2: B31 . . . 24: Byte7 (or Byte29)
Blk2: B23 . . . 16: Byte8 (or Byte30)
Blk2: B15 . . . 8: Byte9 (or Byte31)
Blk2: B7 . . . 0: Byte10 (or Byte32)
Blk3: B31 . . . 24: Byte11 (or Byte33)
Blk3: B23 . . . 16: Byte12 (or Byte34)
Blk3: B15 . . . 8: Byte13 (or Byte35)
Blk3: B7 . . . 0: Byte14 (or Byte36)
Blk4: B31 . . . 24: Byte15 (or Byte37)
Blk4: B23 . . . 16: Byte16 (or Byte38)
Blk4: B15 . . . 8: Byte17 (or Byte39)
Blk4: B7 . . . 0: Byte18 (or Byte40)
Blk5: B31 . . . 24: Byte19 (or Byte41)
Blk5: B23 . . . 16: Byte20 (or Byte42)
Blk5: B15 . . . 8: Byte21 (or Byte43)
Blk5: B7 . . . 0: Byte22 (or Byte44)

The GENERIC READ command (command code 4Ch) is a read/write block command that also may include up to, for example, 24 bytes. Table 15 below provides an example of the bit definitions of this command.

TABLE 15

GENERIC WRITE COMMAND.

Blk0: B31 . . . 29: Response Type
Blk0: B28: Slave Address Included
Blk0: B27 . . . 23: Number of bytes in VDM
Blk0: B22 . . . 21: reserved
Blk0: B20: Byte 1 definition
Blk0: B19: Last VDM in the sequence
Blk0: B18 . . . 16: reserved
Blk0: B15 . . . 8: Byte1 (Byte23 if Last VDM = 1b)
Blk0: B7 . . . 0: Byte2 (or Byte24)
Blk1: B31 . . . 24: Byte3 (or Byte25)
Blk1: B23 . . . 16: Byte4 (or Byte26)

TABLE 15-continued

GENERIC WRITE COMMAND.

Blk1: B15 . . . 8: Byte5 (or Byte27)
Blk1: B7 . . . 0: Byte6 (or Byte28)
Blk2: B31 . . . 24: Byte7 (or Byte29)
Blk2: B23 . . . 16: Byte8 (or Byte30)
Blk2: B15 . . . 8: Byte9 (or Byte31)
Blk2: B7 . . . 0: Byte10 (or Byte32)
Blk3: B31 . . . 24: Byte11 (or Byte33)
Blk3: B23 . . . 16: Byte12 (or Byte34)
Blk3: B15 . . . 8: Byte13 (or Byte35)
Blk3: B7 . . . 0: Byte14 (or Byte36)
Blk4: B31 . . . 24: Byte15 (or Byte37)
Blk4: B23 . . . 16: Byte16 (or Byte38)
Blk4: B15 . . . 8: Byte17 (or Byte39)
Blk4: B7 . . . 0: Byte18 (or Byte40)
Blk5: B31 . . . 24: Byte19 (or Byte41)
Blk5: B23 . . . 16: Byte20 (or Byte42)
Blk5: B15 . . . 8: Byte21 (or Byte43)
Blk5: B7 . . . 0: Byte22 (or Byte44)

Figure 2:
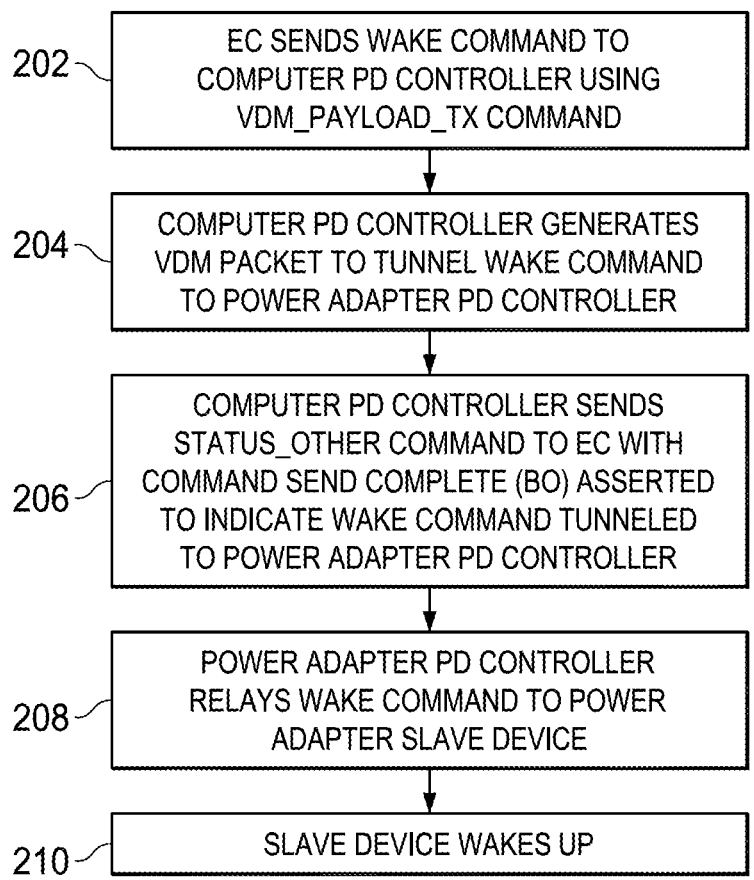
FIG. 2 shows a method by which an embedded controller in a computer can tunnel a command to a power adapter to wake up a slave device in the power adapter in accordance with various examples.
Figure 3:
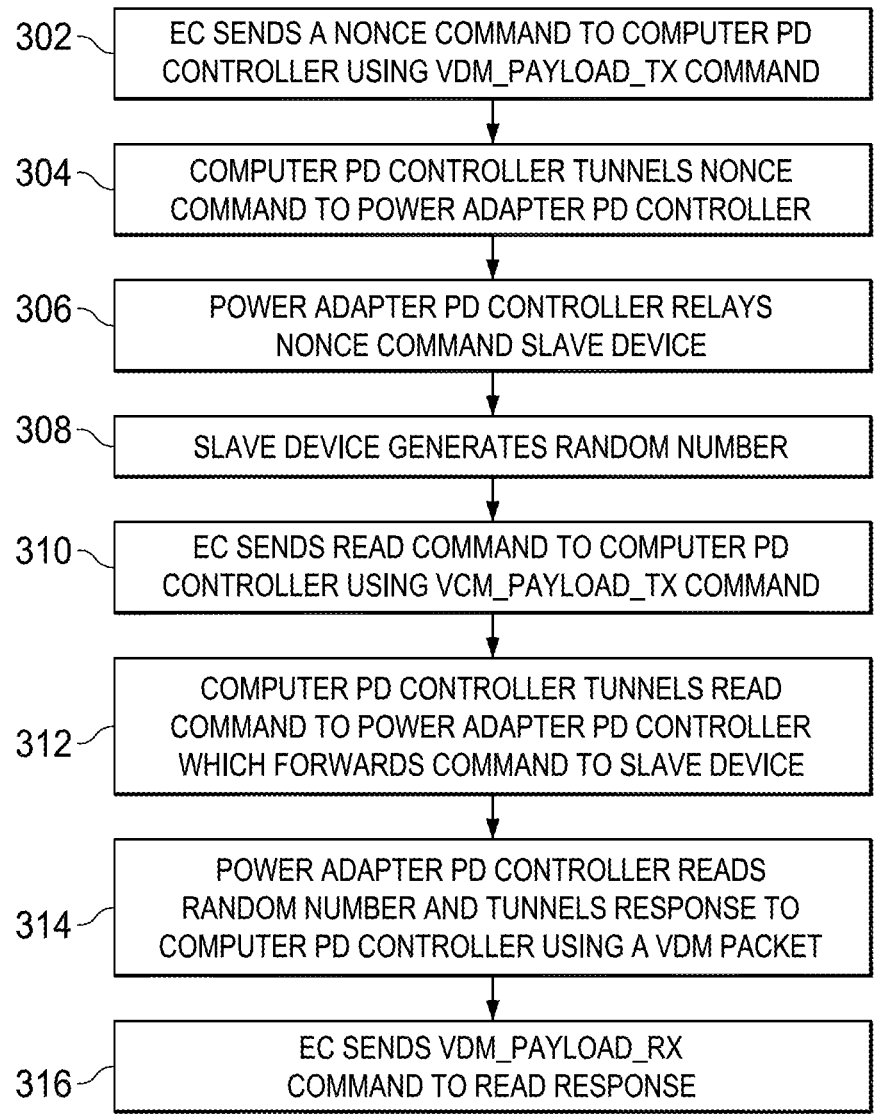
FIG. 3 shows a method by which the embedded controller can tunnel a command to the power adapter to authenticate the slave device in the power adapter in accordance with various examples.
Figure 4:
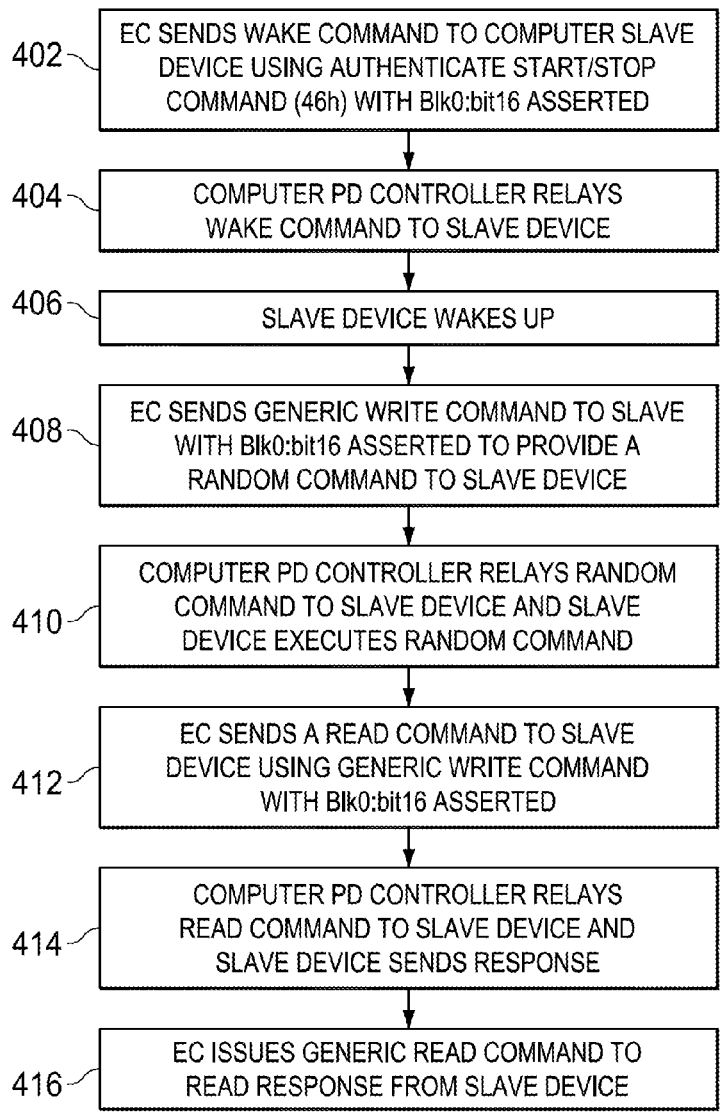
FIG. 4 shows a method by which the embedded controller can wake up and authenticate a local slave device in the computer.

FIGS. 2-4 illustrate various methods implementable on electronic system 100. In some embodiments, the slave devices 120, 170 may automatically transition to a sleep (lower power) mode after performing a requested action. Thus, to cause a slave device to perform a new action, the slave device is first woken up. FIG. 2 shows a method by which the EC 160 can wake up the slave device 120 in the power adapter 110. In general, the EC 100 sends a command via bus 158 (e.g., SMBus) to the computer PD controller 155 containing a command the EC 160 wants to send to the slave device 120 in the power adapter. The computer PD controller 155 relays this command using a USB PD VDM packet to the power adapter PD controller 115 which, in turn, relays the command to the local slave device 120 in the power adapter over bus 117 (e.g., a 1-wire interface protocol). The format of such VDMs in various embodiments is such that the power adapter PD controller 115 can easily relay the bits to the slave device 120. The operations shown in FIG. 2 can be performed in the order shown, or in a different order. Further two or more of the operations may be performed in parallel instead of sequentially.

At 202, the EC 160 sends a wake command intended for the power adapter's slave device 120. The wake command is provided to the computer PD controller 155 using the VDM_PAYLOAD_TX command (command code 4Ah) detailed above. The specific content of the VDM_PAYLOAD_TX command may be the specific bits required for a wake command to the particular slave device, and thus is application specific.

At 204, the computer PD controller 155 generates a VDM packet to tunnel the wake command to the power adapter PD controller 115. At 206, the computer PD controller 155 also sends a STATUS_OTHER command back to the EC 160 with the CommandSendComplete (bit 0) asserted to indicate to the EC 160 that the wake command was tunneled successfully to the power adapter PD controller 115. The EC 160 may wait for a predetermined period of time before taking any further action with respect to the slave device 120 to give the slave device sufficient time to complete its wake up process.

At 208, the power adapter PD controller 115 relays the wake command to the power adapter slave device 120. At 210, the slave device 120 wakes up and is ready for an additional operation such as performing an authentication process. In some embodiments, the slave device 120 is authenticated by the EC 160 to thereby authenticate the power adapter 110.

FIG. 3 shows an example of method by which the EC 160 authenticates the slave device 120 in the power adapter. The operations shown in FIG. 3 can be performed in the order shown, or in a different order. Further two or more of the operations may be performed in parallel instead of sequentially.

At 302, the EC 160 sends a nonce command to the computer PD controller 155 using the VDM_PAYLOAD_TX command. The nonce command may include a value that is used by the slave device for the authentication process. For example, the value may be a counter or time of day or any other value that frequently changes. At 304, the computer PD controller 155 tunnels the nonce command to the power adapter PD controller using a VDM packet. The computer PD controller also may issue a STATUS_OTHER command with the CommandSendComplete bit (bit 0) asserted to indicate a successful transfer of the nonce command between the PD controllers. At 306, the power adapter controller relays the nonce command to the slave device 120 over bus 117, and the slave device responds by, for example, generating at 308 a random number to be used during the authentication process.

At 310, following a predetermined waiting period (to allow the slave device sufficient time to execute the nonce command), the EC sends a read command to the computer PD controller using the VDM_PAYLOAD_TX command (the read command is the payload of the VDM_PAYLOAD_TX command). At 312, the computer PD controller 155 tunnels the read command to the power adapter PD controller 115 which, in turn, forwards the read command to the slave device 120.

At 314, the power adapter PD controller 115 reads the random number from the slave device and tunnels a response back to the computer PD controller 155 using a VDM packet. The tunneled response includes the random number generated by the slave device 120. At 316, the EC sends a VDM_PAYLOAD_RX command to the computer PD controller 155 to read the value of the random number. The EC 160 authenticates the slave device 120 upon examination of the random number from the slave device.

FIG. 4 shows an example of how the EC 160 in the computer 150 can communicate with its local slave device 170 via the computer PD controller 155. The EC 160 sends a command via bus 158 (e.g., SMBus) to the computer PD controller 155 containing a command that the EC wants to send to its local slave 170. The computer PD controller 155 extracts the bytes from the command and relays the extracted bytes to the slave device 170 using, for example, a 1-wire protocol between the PD controller 155 and the slave device 170. The format of the commands between the EC 160 and the computer PD controller 155 is such that the computer PD controller 155 can readily relay the bits to the slave device. The operations shown in FIG. 4 can be performed in the order shown, or in a different order. Further two or more of the operations may be performed in parallel instead of sequentially.

At 402, the EC sends a wake command to the computer slave device 170 using the AUTHENTICATE START/STOP command (command code 46h) with bit 16 asserted. As explained above, bit 16 specifies that the command is to be sent to the local slave device 170 rather than tunneled to the PD controller 115 in the power adapter. At 404, the computer PD controller 155 relays the wake command to the local slave device 170 in accordance with bit 16. At 406, the slave device 170 wakes up.

At 408, the EC then sends a GENERIC WRITE command intended for the slave device 170 with the Blk0:bit 16 asserted to the computer PD controller 155 to provide a Random command to the slave device. At 410, the computer PD controller 155 relays the Random command to the slave device 170 and the slave device executes the command.

At 412, the EC 160 then sends a Read command intended for the local slave device 170 using the GENERIC WRITE command with Blk0:bit 16 asserted to cause the Read command to be provided to the slave device 170. At 414, the computer PD controller 155 relays the Read command to the slave device, and the slave device sends a response back to the PD controller. At 416, the EC issues a GENERIC READ command to read the response returned by the slave device 170 as part of the authentication process.

Figure 5:
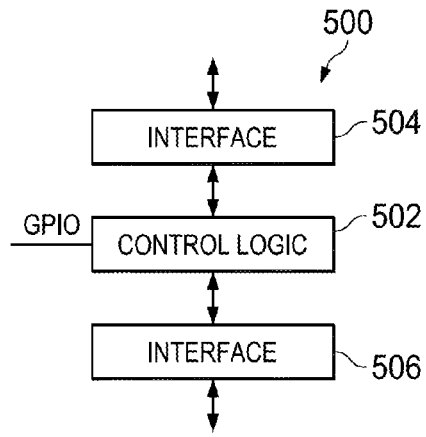
FIG. 5 shows a hardware architecture suitable to implement the various controllers described herein.

FIG. 5 shows an architecture 500 that can be implemented for any or all of the EC 160, power adapter PD controller 115, and computer PD controller 155. The illustrative architecture includes control logic 502 which may be a microprocessor, microcontroller, a state machine, or any other type of hardware suitable to implement the operations described herein. The control logic 502 may have one or more GPIO signals, and may couple to various interfaces such as interfaces 504 and 506. The interfaces 504, 506 may be used to implement interfaces to the slave devices 120, 170, interfaces between the PD controllers and/or an interface between the EC 160 and computer PD controller 155.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic system, comprising:
   a computer including an embedded controller (EC) coupled to a computer power delivery (PD) controller; and
   a power adapter including a power adapter PD controller coupled to a slave device and configured to communicate with the computer over a communication link, the communication link including signals for a power negotiation between the computer PD controller and the power adapter PD controller;
   wherein the computer PD controller is configured to receive a command from the EC and, in response to the received command, to generate and transmit across the communication link a universal serial bus (USB) vendor defined message (VDM) header and one or more vendor defined objects (VDOs) including information from the received command; and
   wherein the power adapter PD controller is configured to respond to the one or more VDOs either by changing an output signal to the slave device connected to the power adapter PD controller, to report back to the computer PD controller a state of a general purpose input/output (GPIO) pin of the power adapter PD controller, or to change the state of the GPIO pin.

2. The electronic system of claim 1, wherein the received command includes a payload that contains information to be included in the one or more VDOs to initiate an authentication of the slave device connected to the power adapter PD controller.

3. The electronic system of claim 2, wherein the information includes an external interface field that specifies a type of interface over which to initiate the authentication to the slave device and another bit field that specifies whether to use the interface type specified in the external interface field over which to initiate the authentication.

4. The electronic system of claim 2, wherein the information includes an address of the slave device.

5. The electronic system of claim 1, wherein the computer PD controller is configured to receive a transmit command from the EC containing a payload whose information includes a value used to authenticate the slave device connected to the power adapter PD controller.

6. The electronic system of claim 5, wherein the EC is configured to submit a receive command to cause the computer PD controller to return an authentication response from the slave device connected to the power adapter PD controller.

7. The electronic system of claim 1, wherein the computer PD controller is configured to receive a GPIO status command from the EC and, in response, the PD controller is configured to generate the VDM header to specify a GPIO status request, and the power adapter PD controller responds by providing a GPIO status VDO to the computer PD controller indicating the status of the GPIO pin of the power adapter PD controller.

8. The electronic system of claim 1, wherein the computer PD controller is configured to receive a GPIO write command from the EC and, in response, the PD controller is configured to generate the VDM header to specify a GPIO write request and to generate a VDO to specify a logic state to be forced on the GPIO pin of the power adapter PD controller.

9. The electronic system of claim 1, wherein the power adapter PD controller is configured to tunnel a message over the communication link to the computer PD controller indicating the GPIO pin of the power adapter PD controller has changed state, and wherein the computer PD controller responds by asserting a GPIO pin of the computer PD controller to signal to the EC that an event has occurred.

10. A computing device, comprising:
an embedded controller (EC); and
a computer power delivery (PD) controller coupled to the EC configured to communicate with a PD controller in an adapter over a communication link to thereby negotiate a power allocation between the PD controllers;
wherein the computer PD controller is configured to:
receive a command from the EC and, in response to the received command, to generate and tunnel across the communication link a universal serial bus (USB) vendor defined message (VDM) header and one or more vendor defined objects (VDOs) including information from the received command to thereby communicate with a slave device coupled to the adapter PD controller; and
to receive a status message from the adapter PD controller across the communication link indicative of a logic state of a general purpose input/output (GPIO) pin of the power adapter PD controller.

11. The computing device of claim 10, wherein the received command includes a payload that contains information to be included in the one or more VDOs to initiate an authentication of the slave device.

12. The computing device of claim 11, wherein the information includes an external interface field that specifies a type of interface over which to initiate the authentication to the slave device and another bit field that specifies whether to use the interface type specified in the external interface field over which to initiate the authentication, and the information also includes an address of the slave device.

13. The computing device of claim 10, wherein the computer PD controller is configured to receive a transmit command from the EC containing a payload whose information includes a value used to authenticate the slave device connected to the power adapter PD controller.

14. The computing device of claim 13, wherein the EC is configured to submit a receive command to cause the computer PD controller to return an authentication response from the slave device.

15. The computing device of claim 10, wherein the computer PD controller is configured to receive a GPIO status command from the EC and, in response, the PD controller is configured to generate the VDM header to specify a GPIO status request, and to receive a response from the adapter PD controller that includes a GPIO status VDO indicating the status of the GPIO pin of the adapter PD controller.

16. The computing device of claim 10, wherein the computer PD controller is configured to receive a GPIO write command from the EC and, in response, the PD controller is configured to generate the VDM header to specify a GPIO write request and to generate a VDO to specify a logic state to be forced on the GPIO pin of the power adapter PD controller.

17. A method, comprising:
sending a wake command from an embedded controller in a computer to a power delivery (PD) controller in the computer to wake up a slave device in an adapter;
tunneling a command by the computer PD controller to a PD controller in the adapter to cause the slave device to wake up;
relaying the tunneled command by the power adapter PD controller to the slave device; and
waking up the slave device.

18. The method of claim 17 further comprising authenticating the slave device by an EC.

19. The method of claim 17 further comprising negotiating a power allocation between the PD controllers.

20. The method of claim 17 further comprising sending a status command by the computer's PD controller to the EC to indicate that a wake command has been successfully tunneled to the power adapter PD controller.

* * * * *